United States Patent [19]

Forsman

[11] 4,170,068
[45] Oct. 9, 1979

[54] APPARATUS FOR TRANSMISSION OF MEASURING MOTION IN GAUGING EQUIPMENT

[76] Inventor: Lars Ö. Forsman, Rörögatan18, S-253 72 Helsingborg, Sweden

[21] Appl. No.: 906,644

[22] Filed: May 16, 1978

Related U.S. Application Data

[63] Continuation of Ser. No. 743,858, Nov. 22, 1976, abandoned.

[30] Foreign Application Priority Data

Nov. 21, 1975 [SE] Sweden .................................. 7513098

[51] Int. Cl.² .............................................. G01B 5/00
[52] U.S. Cl. ................................ 33/169 R; 33/147 E; 33/172 R; 248/DIG. 4
[58] Field of Search ............. 33/147 E, 169 R, 172 R, 33/174 R, 174 L, 174 Q, 174 M; 248/295, DIG. 4

[56] References Cited

U.S. PATENT DOCUMENTS

| | | | |
|---|---|---|---|
| 2,219,037 | 10/1940 | Street | 248/DIG. 4 |
| 2,458,344 | 1/1949 | Carroll | 33/172 R |
| 3,011,780 | 12/1961 | Hanisko | 33/174 L |
| 3,021,603 | 2/1962 | Beeson | 33/174 L |
| 3,217,418 | 11/1965 | Wennerberg | 33/174 Q |
| 3,545,088 | 12/1970 | Johnson | 33/174 R |

FOREIGN PATENT DOCUMENTS

| | | | |
|---|---|---|---|
| 1337854 | 8/1963 | France | 33/174 Q |
| 1060110 | 2/1967 | United Kingdom | 33/174 R |
| 1357324 | 6/1974 | United Kingdom | 33/174 Q |

Primary Examiner—Richard R. Stearns
Attorney, Agent, or Firm—Paul L. Gardner

[57] ABSTRACT

A gauging frame for transmitting measuring movements comprises two bar elements allowing components to be mounted thereto individually and each independently of other components by engagement with the bar element transversely thereof.

5 Claims, 6 Drawing Figures

APPARATUS FOR TRANSMISSION OF MEASURING MOTION IN GAUGING EQUIPMENT

This is a continuation of application Ser. No. 743,858, now abandoned, filed Nov. 22, 1976.

In the process of mechanical manufacture the quality of a product or details included therein is to a high degree connected to the accuracy of measurement. Therefore, one tries to achieve in modern production an optimum quality by a consequent following-up of predetermined measurement demands in all steps of manufacture.

An increased volume of production and increased demands for measurement accuracy have created a greater need for measuring fixtures than previously. A reason which has contributed substantially to this increased need of measuring fixtures is also that it is desired to control the quality to a predetermined level during the manufacture. Therefore, the checking and supervising operations have also to a continuously higher degree been removed from the checking or the measuring room to the workshop, where the operator, who supervises and influences the manufacture, also shall have the possibility to check continuously that the measurement requirements are fulfilled. As a rule this must take place during the machine time, which provides a stressing situation as far as time is concerned. Generally measuring fixtures are built for simultaneous indication of all dimensions of interest, since it is often necessary to make several measurements under said conditions and still maintain a high degree of measurement accuracy.

Such a measuring fixture always has to be specifically shaped and designed according to the form, size and weight of the product to be measured as well as the number of measuring points and according to different measurement requirements. However, it occurs rarely today that a measuring fixture is specially made only for one object to be measured, since small changes in the supervising condition are apt to include an expensive rebuilding or even a reconstruction and remanufacture of the entire fixture. Measuring fixtures which are built up by ready-made standardized components therefore have become increasingly dominating.

The measuring fixture which has been built up according to a system can easily be changed to other dimensions and adapted to new shapes. The components of such fixtures are reusable in new fixtures for checking measured objects under entirely different conditions, after having been demounted from a fixture. A good deal of construction and manufacture also will be avoided, since the measurement transmitting components are available as standard elements. It is possible to provide without difficulties combinations for multiple type outside measurement of rotationally symmetrical objects which are in general located between centres, on a mandrel or in V-blocks, by means of most of the brands of standardized components for measuring fixtures. As a rule measuring fixtures for such objects may be assembled without any reference to drawings. It is considerably more difficult to achieve a solution by means of standard components for measuring objects having an irregular shape or for small measuring objects with closely spaced measuring points.

There is, however, on the market a system which could be considered as flexible, wherein individual elements are interconnected to a device which transmits the measuring motion, the so called gauging frame, but also in this case constructional work is required in difficult cases. Thus the gauging frame senses the measure of the measured object and supplies it to the indicator, for instance a gauge or an electronic or pneumatic transmitter. When several gauging frames shall interact on a measured object where the measurements are independent of each other, it is particularly important to provide for the individual gauging frame a correctly located measuring stop or indicator holder, in order to allow the gauging frame, when mounted, to co-operate with one or several other gauging frames. In this connection the designer must also determine the location of frame fasteners. A gauging frame has in general two frame fasteners, and the mutual location thereof is dependent of the necessary location of possible measuring stops, indicator holders and spring fasteners, since they are located on the same shaft. The frame fasteners shall keep the gauging frame fixed in the measuring fixture by means of a mounting plate and therefore the location of the frame fasteners determines the location of the screw holes in the mounting plate.

A form of a gauging frame which is common today is the type which comprises two parallel shafts which have their respective ends interconnected to one another by means of two leaf spring links or so called frame bridges. In a measuring fixture one shaft will be permanently connected to the mounting plate and the other can move in the longitudinal direction of the shaft. The movement can be guided in one direction or the other by an alternative mounting of helical springs. The movement can also be limited by an adjustable stop in order to allow control of the movement range of the measuring arm which is mounted on the movable shaft of the gauging frame.

A measuring frame is always given an individual shape and, therefore, it has to be mounted with the standard components in a predetermined order, since the frame bridges close the parallelogram. If any of the components should be erroneously mounted on one or the other of the shafts one of the frame bridges and maybe also one or more of the other components always have to be demounted and then remounted in a different order for a correct mounting.

It is a primary object of the invention to provide a new and improved apparatus for transmitting measuring movements, which can easily be mounted when the apparatus is built up or rearranged.

It is a further object of this invention to provide a new and improved apparatus of the kind referred to wherein an individual element can be rearranged or adjusted independently of other elements.

A still further object of this invention is to provide a new and improved apparatus of the kind referred to wherein the mounting of elements is independent of the order of such elements.

Another object of this invention is to provide a new and improved gauging frame for transmitting measuring movements, which provides an increased flexibility and facilitates the construction and design of a measuring apparatus.

Additional objects and advantages of the invention will be set forth in part in the description which follows and in part will be obvious from the description, or may be learned by practice of the invention. The objects and advantages of the invention may be realized and attained by means of the instrumentalities and combinations particularly pointed out in the appended claims.

To achieve the foregoing objects and in accordance with the purpose of the invention, as embodied and broadly described herein, there is provided an apparatus for transmitting measuring movements comprising two mutually spaced and substantially parallel bar elements for mounting measuring arms, measuring stops, indicator holders and similar measuring components, means connecting said bar elements for axial relative movement, means for mounting said apparatus to a support, and at least one mounting surface on at least one of said bar elements, extending along said one bar element and available for mounting said measuring components and said mounting means, respectively, individually in an optional order and in a desired combination at positions on said one bar element determined by the object to be measured and said support, respectively, by the components and the mounting means being engaged, individually and independently of each other and the connecting means, with said surface transversely of said one bar element.

The accompanying drawings, which are incorporated in and constitute a part of this specification, illustrate embodiments of the invention and, together with the description, serve to explain the principles of the invention.

Reference will now be made in detail to the present preferred embodiments of the invention, examples of which are illustrated in the accompanying drawings.

Figure 1:
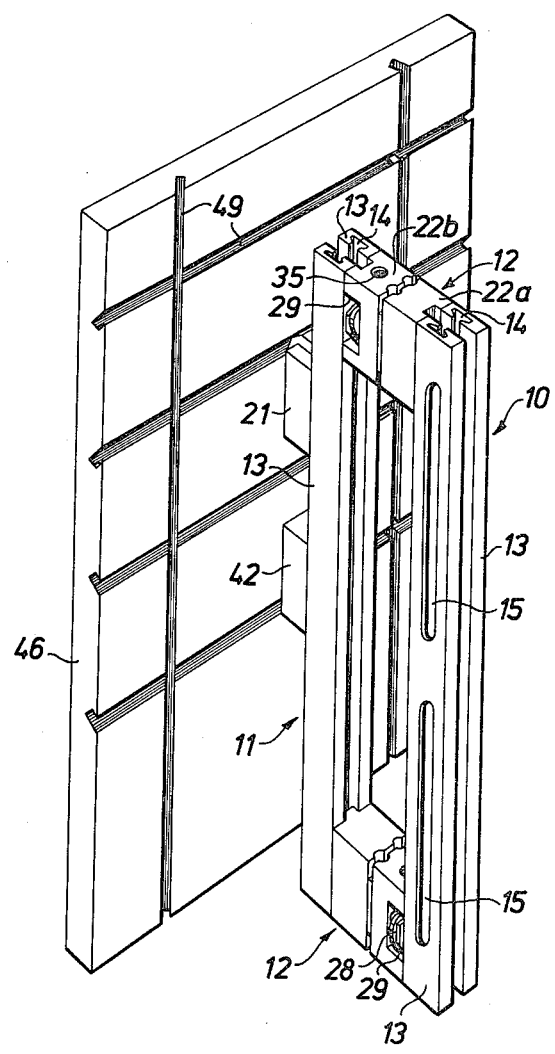
FIG. 1 is a perspective view showing a gauging frame according to one embodiment of the invention.
Figure 2:
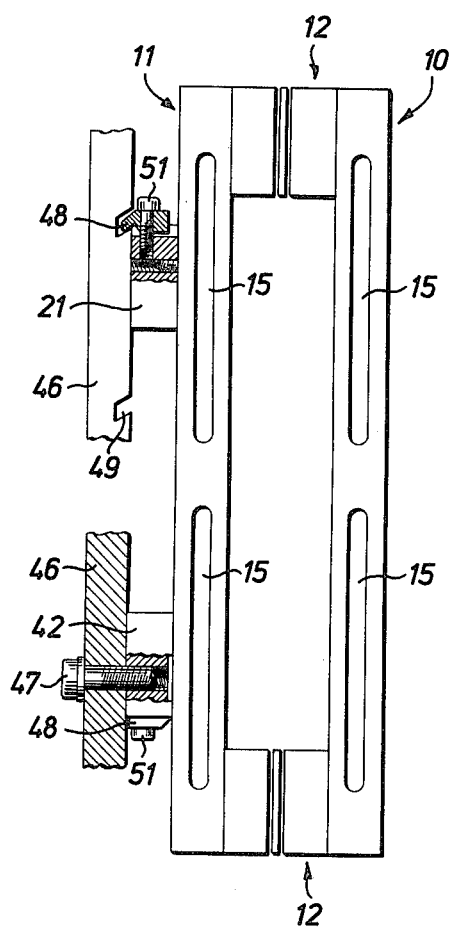
FIG. 2 is a side view, partly a sectional view, of the embodiment according to FIG. 1 also disclosing a modified fastener for the gauging frame.

The gauging frame in FIG. 1 comprises two mutually parallel bar elements 10 and 11, which are interconnected at their ends by means of a connecting device 12, which admits a limited axial movement of the elements in relation to each other against a spring load. Each of elements 10 and 11 consists of two rails 13, see also FIG. 2, each of which has an undercut groove 14 which extends along the rail at one side thereof. Thereby the rail has a U-shaped or channelled cross sectional form. It has in its web two elongated slots 15 having substantially the same width as the distance between the two limbs or flanges of the channel. The two rails 13, which are included in each of the two elements 10 and 11, are interconnected by means of two spacing elements, each of which comprises a socket shaped shaft 16, FIG. 3, having rectangular cross sectional form externally and a head 17, which is integral with the shaft. This head is provided with two ribs 18 inclined surfaces of which engage corresponding inclined surfaces of rails 13 at 19, as can be seen from FIG. 4. In spacing element 16, 17 there is inserted a screw 20 having a countersunk head which is received in head 17, and by means of this screw which is screwed into element 12 and a block 21, FIG. 3, respectively, the two rails 13 are pressed against shaft 16 by cam action between the inclined surfaces at 19. Shaft 16 is so dimensioned that the rails will be mutually spaced at a distance determined by shaft 16, which distance corresponds to the width of slots 15 and the distance between the flanges of rail 13. Elements 10 and 11 thus have mutually perpendicular through slots in the longitudinal direction thereof for the insertion of tools, such as screwdrivers and pin spanners, when a measuring fixture is being mounted and for the insertion and the fastening of components which are to be included in the measuring fixture.

Each of connecting means 12 comprises two blocks 22a and 22b the surfaces of which, facing each other, are formed with two substantially V-shaped grooves 23. These grooves extend in parallel to each other and are located opposite to each other, and in each pair of grooves there are received two balls 24 which are located by means of a ball holder 25 which comprises a plate having holes for receiving the balls with clearance. In the plate there is also an elongated hole 26 through which passes a screw 27, the head 28 of which, being cylindrical and having a hexagonal socket, is received in a recess 29 in one block 22a, a spring washer 30 being located between head 28 and the bottom of recess 29. Screw 27 extends with clearance through blocks 22a and 22b and is screwed into a nut washer 31, a number of balls 32 being arranged between this nut washer and block 22b. The balls are located by means of a ball holder 33, in which the balls are received with clearance in holes. A slot 34 is arranged for screw 27 in block 22b, said slot admitting movement of this block in relation to screw 27 in the transverse direction thereof. A helically wound pressure spring 36 is engaged between a plug 35 which has been screwed into block 22b, and screw 27, the spring being guided on a peg 37 on plug 35 and engages the shaft of screw 27. By means of spring 36 the screw is pressed into engagement with a peg 38 located on a plug 39 which has been screwed into block 22b. By screwing this plug the position of peg 38 can be changed. Thus block 22a can be displaced in relation to block 22b over a limited distance against the action of spring 36, the distance being determined by the length of slot 34 and the position of peg 38. This displacement can be realized practically without any friction, since all movements take place by means of the linear anti-friction bearings formed by balls 24 and 32.

Figure 3:
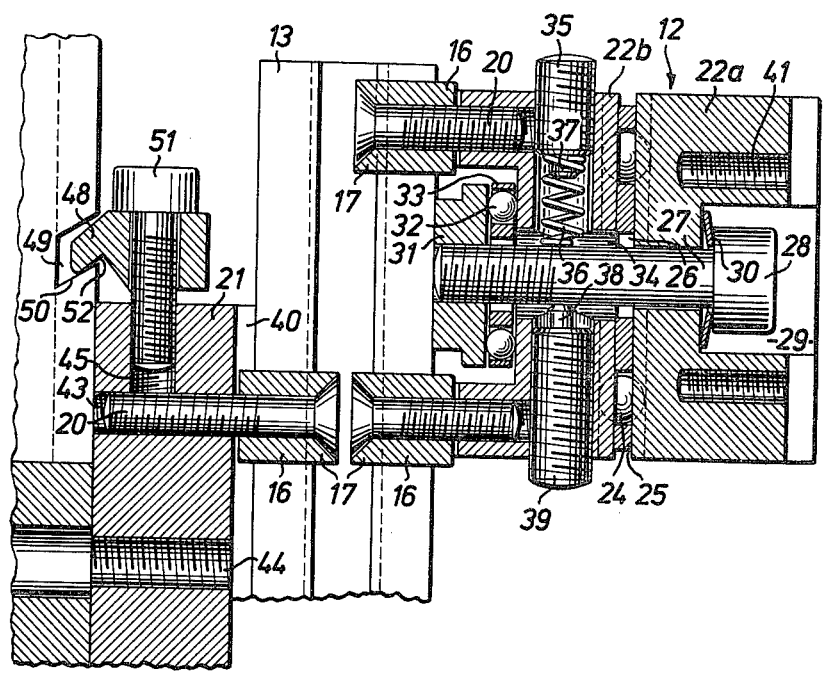
FIG. 3 is an enlarged vertical sectional view of the connection between the two bar elements of the gauging frame at one end of the gauging frame and of the fastener of the gauging frame.
Figure 4:
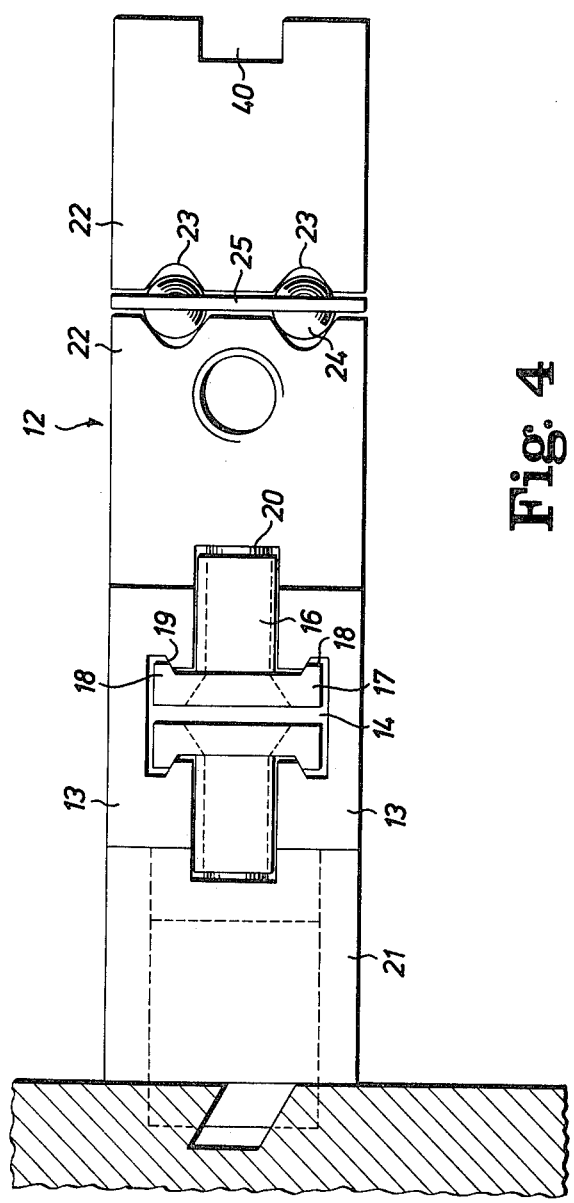
FIG. 4 is a plane view of the connecting means.

Each of blocks 22a and 22b, respectively, has in its external surface a groove 40 for the reception of shaft 16, as well as two threaded holes 41 for engagement with screw 20, as shown in FIG. 3.

It can be seen that the two elements 10 and 11, each comprising two rails 13 in the manner described above, are axially displaceable in relation to each other over a limited distance against the action of spring 36 in each of connecting means 12. The two elements thereby form a gauging frame together with means 12, a so called parallelogram, for the mounting of measuring arms, measuring stops, indicator holders or similar components in a measuring fixture in a manner which will be described later on.

For the mounting of this gauging frame on a support, element 11 is provided with block 21 previously mentioned and with a further block 42, which are fastened onto this element by means of members 16, 17 and screws 20, which are screwed into a through threaded bore 43 extending perpendicularly in relation to the surface of blocks 21 and 42, respectively, engaging the rails 13. These blocks are provided with a groove 40 in the surface engaging the rails 13 for receiving shaft 16 in the same way as in each of blocks 22a and 22b. Besides, blocks 21 and 22 have a further through threaded bore 44 which is parallel with bore 43, as well as a threaded bore 45 which is perpendicular to these bores. Bore 44 may serve the purpose of fastening the gauging frame onto a plate 46, which is an integral part of the support, by means of a screw 47, as shown concerning block 42 in FIG. 2, but the fastening can also take place by means of a hook 48, as shown concerning block 21 in FIG. 2. For interaction with these hooks 48 plate 46 can be formed with a number of grooves 49 crossing each other in the manner which can be seen from FIG. 1. These grooves extend obliquely into the plate, as can be seen from FIG. 2, and hook 48 is pressed against a sloping surface 50 of the groove by means of a screw 51 screwed into bore 45. Thereby a sloping surface 52 of the hook engages sloping surface 50, and since this sloping surface 52 has a greater inclination than sloping surface 50 a component force is obtained when hook 48 is pressed against surface 50, forcing block 21 against plate 46. For the use of two such hooks for mounting the gauging frame to the plate, the plate has for this purpose grooves which are sloping in opposite directions as will be seen from FIG. 1. The width of hooks 48 should be greater than the width of grooves 49, so that a hook can be located also in the crossing point between two grooves. Thereby one can achieve a stepless disposition of the gauging frame at a desired location on plate 49 over the entire length thereof.

Figure 5:
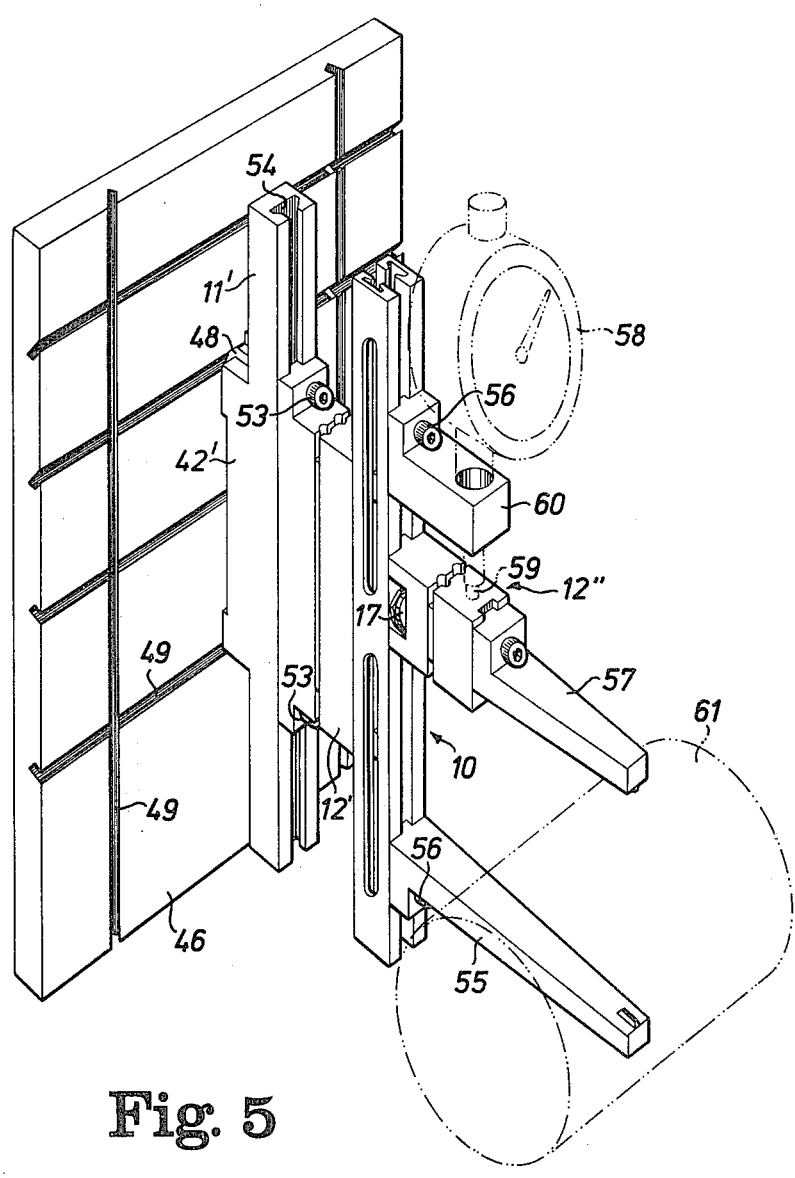
FIG. 5 is a perspective view in accordance with FIG. 1 of another embodiment of the invention.

In FIG. 5 one single connecting means 12' is substituted for two connecting means 12. Said single connecting means may be made in the same way as has been described concerning means 12, but it has a greater length in the longitudinal direction of elements 10, 11 in order to provide the necessary guiding and stabilization of the elements at a relative movement thereof. In the embodiment according to FIG. 5 one of the blocks of connecting means 12' is fastened in a desired displaced position to element 11' by means of screws 53 and associated nuts, which engage for instance a T-groove 54 in this element. Thus, in this case element 11' may have a more simple design than element 11' in FIG. 1. Furthermore, element 11' in FIG. 5 is made integral with a block 42' which is formed with screw bores for two hooks, one being shown at 48, which serve the purpose of fastening element 11' to plate 46, as has been described previously, the hooks being engaged from opposite directions with the plate each in one groove. As a rule it is only necessary to loosen one hook and then retighten it for displacement of element 11' in relation to the plate and fastening of the same in a new position. In the embodiment according to FIG. 5 there are great possibilities of locating element 10 in a desired displaced position, since one can choose desired grooves for hooks 48 and one can infinitely vary the fastening of the connecting means 12' in a desired displacement position on element 11' and furthermore it is possible to fasten element 10 in a desired displacement position on connecting means 12'. FIG. 5 also shows how the previously mentioned measuring components, such as measuring arms, measuring stops and indicator holders, can be mounted on the gauging frame. Thus FIG. 5 shows a measuring arm 55, which is permanently mounted on element 10 by means of a screw 56 and a nut which is received inside element 10 and may be of the same shape as head 17. Besides, FIG. 5 shows a measuring arm 57, which is mounted on a connecting means 12" of a design similar to the connecting means 12 which has been described in detail, this connecting means 12" being fixedly screwed onto element 10 by means of screw 20 and head 17. Thus, arm 57 is movable in relation to element 10 to a limited extent against spring action in connecting means 12", and a measuring point 59 of a measuring indicator 58 contacts the movable block in connecting means 12", this indicator being supported by a holder 60, which is fixed to element 10 by means of a screw 56 and an associated nut.

In order to measure the diameter of a cylindrical object 61 this object is introduced between measuring arms 55 and 57 by guiding means in a way which is known per se regarding measuring fixtures, measuring arm 55 forming a fixed reference and measuring arm 57 moving in relation to measuring arm 55 and actuating measuring indicator 58. However, measuring arm 55 is floatingly mounted by means of connecting means 12' in relation to the fixed reference which is formed by the support, represented by plate 46. This principle including floating measuring points is well-known per se in the art. Measuring arms, measuring stops, indicator holders or similar means can be connected with the gauging frame in a great variation of combinations for measuring different dimensions. Such means may also be mounted in slots 15.

Figure 6:
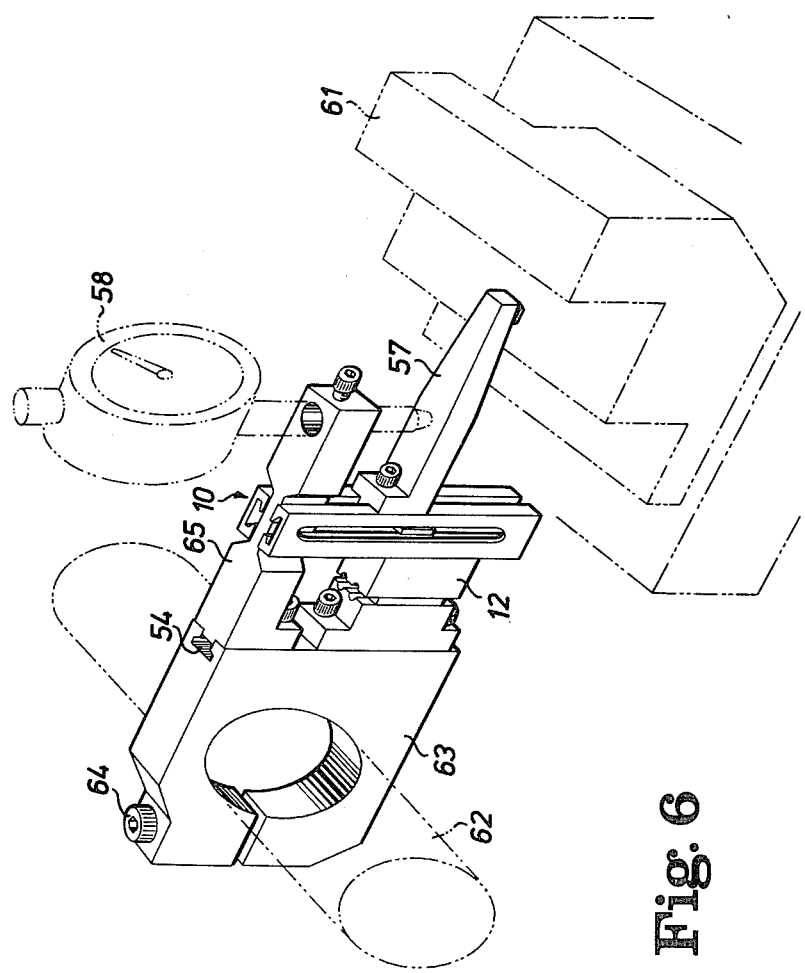
FIG. 6 is a perspective view corresponding to FIG. 1 of still another embodiment of the invention.

FIG. 6 shows another manner of using the apparatus for transmitting measuring movements according to the invention. In this case a bar 62 in a support is connected with a fastening element 63, which is tightened about rod 62 by means of a clamp screw and in turn supports element 10 by means of connecting means 12. Element 63 has for this purpose a T-groove 54. A holder 65 for a measuring indicator 58 is mounted on element 63 while a measuring arm 57 is mounted on element 10 last mentioned element being displaceable with clearance in relation to holder 65. Measuring arm 57 thus measures the machine element 61 in relation to support 62 and transmits its motion directly to indicator 58.

The advantages obtained by the described apparatus for transmitting measuring movements according to the invention can be summarized according to the following:

1. The basis for all conceivable combinations of measuring arms, measuring stops, indicator holders or similar components is a completely mounted parallelogram with associated fastening means. This means that few components are to be handled in all steps, since the naked parallelogram having fastening means is a complete operative unit. Corresponding mounting and demounting work can be disposed of. In prior art systems which are based on the parallelogram, two shafts first have to be fixed to flexible links (bridges), while all other means to be used are removably mounted on the respective shafts and in a correct order in relation to each other. They are given the final position during the final mounting step in the fixtures. Before the tightening of the bridges against the shafts these as a rule have to be placed on two transversal rulers which are set in one plane in relation to each other, in order to prevent the parallelogram from being slant. This preparation work with each measuring unit can be disposed of as well as the risk of slantness on the basis of erroneous mounting. In other words the parallelogram is ready to be mounted directly to the fixture. After a rough adjustment of the position of the parallelogram in relation to the grooves available on the mounting plate the other components can be mounted in a suitable order and independently of each other.

2. The new form of a parallelogram admits in principle a doubled mounting space for components on the respective bar elements. In comparison with a known parallelogram, where each component occupies a corresponding part of the shaft length each component of the new parallelogram occupies only a corresponding part of one half of the bar, since it is possible to mount components on opposite sides of each element 10 and 11, respectively. Thus, there is achieved an available space for each component at the same length of the bars, which space is twice the size and which provides increased flexibility.

3. It is possible to mount and demount measuring components on the bar elements of the parallelogram independently of the order of location in relation to each other. Although the gauging frames are located closely beside each other, it is possible for instance to move or adjust a measuring arm since this can be done from the front side through the slot between rails 13 which are connected together. In previously known systems the screw for each measuring arm is placed inwardly, and if the gauging frames are mounted in juxtaposition, it is difficult to reach since, moreover, a tension spring is engaged between the frame shafts.

4. The frame can be mounted on and demounted from the mounting plate from principally two directions and always to the front side of the mounting plate. In a vertical mounting, one screw at the frame fastener is always available. In a horizontal mounting both screws are often available. In corresponding known systems of components the screw head is available on the rear of the mounting plate, since the frame fasteners are located by a through screw. If the mounting plate is placed as a fitting in a certain type of known fixtures the plate has to be demounted before the screw for the frame fastener can be available. Hence, the mounting work is made more simple.

5. The frame fastener has alternatives for attachment in grooves or by a through screw. If no premanufactured mounting plate having grooves is available, the frame fastener can still be fixed to the plate in a conventional manner.

6. Gauging frames can be mounted in two directions and on the desired place by means of a premanufactured vertically or horizontally mounted mounting plate having cross groove systems. By moving the frame axially at least about one third of the length of the frame in both directions in relation to the frame fastener, and by the frame fastener having alternative grooves, a measuring point mounted to the frame can reach any spot within the surface of the mounting plate and in certain cases even outside it. The frame can also be mounted in the centre of a crossing groove, owing to the fact that the hooks of the clamp fastener are considerably wider than the groove. For this reason there are no "dead" surfaces. Furthermore, the grooves reach the edges of the mounting plate.

7. In order to demount and to mount a clamp on the mounting plate, respectively, it is only necessary to actuate one of the screws of the locking hooks in the embodiment according to FIG. 5.

8. The new parallelogram having rails can be built up either by means of a known leaf spring link or by means of a linear ball guide.

(a) The leaf spring link is a more inexpensive alternative, but it has several drawbacks. There should always be two link mechanisms, preferably having the largest possible base, i.e. at the ends of the bars. In such a case there will also be a screw tension spring, which will occupy the space between the bars. Provided with leaf spring links the flexible shaft will not move absolutely rectilinearly. This might be a drawback in exacting cases. A frame having leaf spring links is not sufficiently stabilized in the lateral direction. The measuring point will for instance by affected by a side force by internal measuring of the measured object under rotation, such side force being transmitted by means of the measuring arm to the leaf spring links. A vibration occurs, and this affects the repeat accuracy. Therefore, the use of the leaf spring link should be avoided in cases where there are narrow scopes of tolerance.

(b) The linear ball guide has none of the above mentioned technical drawbacks. It is easy to move and free from clearance and it repeats its own movement very accurately. It can receive side forces of the magnitude which is present by normal measuring forces. Each ball guide can have both a pressure spring and a contacting screw which limit the movement of the movable bar and thereby the movement of the fixed measuring arm which is mounted to the bar. If there is a desire to reverse the measuring force it is either possible to allow the pressure spring and the contacting screw to change places or to turn the entire gauging frame by 180°. This will probably be faster since there is only a need for moving the screw of one of the locking hooks on the gauging frame fastener. In order to reverse the direction of the measuring force in a conventional parallelogram having leaf spring links it is also possible, in such a case, to turn the entire parallelogram by 180°. Other complications follow, however, owing to the fact that the measuring arm and the measuring stop have to change places, and in such case one of the leaf spring links has to be demounted; in other words the gauging frame has to be remounted from the beginning.

9. The new design of the bar elements of the parallelogram in this case provided with rails means inter alia that the fixed reference if needed can be moved by means of the movable bar to the front side, where a gauge could most conveniently be fitted. In known systems the corresponding measure has to be taken either at one side of or above the gauging frame. This is, however, possible also by means of the new system. The rails imply other advantages especially from a mounting point of view. Most of the components, like measuring arms, measuring stops, indicator holders can be mounted from the front side, which is particularly valuable when several gauging frames are juxtapositioned in a fixture. It is also possible to reach the fastening screw on a component which is mounted on the interior element 11 by simply inserting for instance a hexagonal tap spanner through the slot between rails 13 of the outer element 10.

It will be apparent to those skilled in the art that various other modifications and variations in addition to those mentioned above could be made in the apparatus of the invention without departing from the scope and spirit of the invention.

I claim:

1. An apparatus for transmitting measuring motion, comprising:

two bar elements;

at least one of said bar elements including two rails, each of said rails having wall means defining a channel therein, said channels facing one another;

spacing means between said rails for maintaining said channels at a predetermined position with respect to each other;

means for clamping said two rails to one another with said spacing means therebetween;

one of said bar elements having at least one planar outside surface extending therealong;

means connecting said bar elements to one another in spaced, substantially parallel relation; said connecting means permitting relative longitudinal movement of said bar elements;

abutment means limiting relative movement of said bar elements;

resilient means biasing the bar elements to an initial position relative to one another;

means for mounting the other of said bar elements to a support for supporting the apparatus thereon;

at least one measuring component;

and means for detachably mounting said measuring component against said planar outside surface of said one bar element in selected positions therealong determined by the object to be measured.

2. An apparatus for transmitting measuring movements according to claim 1, wherein each of said bar elements includes substantially parallel, oppositely facing surfaces; one of said surfaces of one of said bar elements forming said planar outside surface;

and wherein said means for detachably mounting said measuring component comprises means for clamping the measuring component against said planar outside surface.

3. An apparatus for transmitting measuring movements according to claim 1, wherein said clamping means and said wall means defining said channels include cooperating cam surfaces;

said clamping means further comprising screw means for pressing said clamping means and said wall means against each other at said cam surfaces for clamping said rails against said spacing means.

4. An apparatus for transmitting measuring movements according to claim 1 wherein said connecting means comprise at least one linear anti-friction bearing.

5. An apparatus for transmitting measuring movements according to claim 1 wherein said means for detachably mounting said measuring component includes means permitting limited movement of said measuring component with respect to said one bar element in a direction parallel thereto including linear anti-friction bearing means.

* * * * *